ic process. The presence of the carbonaceous products of this degradation impairs the strength and tenacity of the deposited coatings on the base material.

2,894,888

ELECTROPHORETIC COATINGS AND COMPOSITIONS

James J. Shyne, Caldwell, N.J., and Wilson D. Fletcher, Mary Esther, Fla., assignors to Vitro Corporation of America, New York, N.Y.

No Drawing. Application September 7, 1956
Serial No. 608,420

16 Claims. (Cl. 204—181)

This invention relates to formation of electrophoretic coatings and compositions for use in the formation of said coatings.

The use of electrophoretic techniques for preparing precision coatings has been the basis for many coating processes. While electrophoresis is a particularly attractive technique for coating a given base material, its use has frequently been restricted to special and narrow operating conditions. Conventional electrophoretic dispersions are generally prepared by grinding a solid material in a small quantity of an organic solvent until the particle size of the solid is of the order of a few microns. However, many dispersions prepared in this manner do not have the properties necessary for being deposited electrophoretically to form a uniform coating.

When a particle is immersed in a liquid a quantity of liquid surrounds each particle and becomes fixed thereto. The liquid beyond the fixed liquid is the freely movable liquid of the suspension medium. A potential difference develops between the surface of the solid and the freely movable liquid in which it is suspended and this is referred to as the overall potential. Another potential difference develops between the fixed liquid surrounding each particle and the freely movable liquid of the suspension medium and this is referred to as the zeta potential. The overall potential comprises two individual potential layers which may be referred to as an electrical double layer, i.e., the potential developed between the solid particle and the freely movable liquid and the potential between the fixed liquid surrounding each particle and the moving liquid of the vehicle.

It is known that the process of electrophoresis requires the existence of this electrical double layer. The velocity of electrophoretic migration of the particles through a suspension medium under an impressed potential is directly related to the magnitude of the zeta potential. For this reason it is preferred to use a vehicle, i.e., liquid suspension medium, which imparts a high zeta potential to the dispersion.

The enhancement of this electrical double layer and zeta potential has heretofore required the addition of a quantity of electrolytes. The enhancement is brought about by the sorption of the electrolyte on the surface of the dispersed particles. It is necessary to closely monitor the addition of electrolyte to the dispersion since too much will coagulate the particles and no electrophoretic deposition will result, and too little will not increase the zeta potential sufficiently. Also, prior methods of preparing electrophoretic dispersions have required the use of dispersive agents and other additives to impart stability to the suspended phase. Still other materials such as organic binders have been included in the electrophoretic bath in an effort to impart mechanical strength and adhesive tenacity to the deposited coating. Many of these added materials are co-deposited along with the particular coating particles used and require additional steps for their removal. Further, since many of these additives are organic compounds they may undergo degradation during the electrophoretic process. The presence of the carbonaceous products of this degradation impairs the strength and tenacity of the deposited coatings on the base material.

It is accordingly an object of the present invention to provide an electrophoretic formulation which avoids including such additives and thus avoids the disadvantages incurred thereby.

Another difficulty often found in electrophoretically deposited coatings relates to lack of wet strength. By wet strength is meant the adherence of the coated deposit while in the coating bath. This second difficulty is thought to be caused by the considerably higher density of the dispersed particles and resultant coating relative to the liquid vehicle. The deposited coating frequently sloughs off from the base during the deposition process if the wet strength of the coating is low. It is accordingly an additional object to impart improved wet strength to electrophoretically deposited coatings.

Another object of the present invention is to provide an improved method of coating a particulate substance onto a base material.

A further object is the provision of an electrophoretic formulation and a method for employing same which enables a highly adherent coating to be obtained and which permits greater flexibility of operation.

Another object of the invention is to improve the stability of the electrophoretic suspensions so that more uniform deposits are obtained.

Still a further object is to provide an electrophoretically deposited layer of a heat conductive and/or corrosion resistant material on an electrically conducting surface.

Other objects will be in part apparent and in part pointed out hereinafter.

In one of its broader aspects the invention comprises producing an inorganic coating of high wet strength on a conductive surface which comprises contacting said surface with a suspension of finely divided particles of said inorganic substance in a liquid vehicle selected from the group consisting of nitromethane, nitroethane and nitropropane and halogen derivatives thereof and electrophoretically depositing said particles from said suspension.

Electrophoretic coating may be carried out in any conventional electrolytic cell. The surface to be coated is cleaned by conventional cleaning steps, such as by degreasing, to remove foreign matter. In some cases we have found it advantageous to etch the surface to provide increased mechanical bonding of the electrophoretically applied coating to the base. To initiate deposition of the suspended particles a potential of between 50 and 500 volts D.C. per inch is applied between the electrodes. The current density used for the coating process depends upon the particular inorganic material, length of time to form the deposit, applied voltage and spacing of electrodes in the bath and the desired thickness of coating.

Electrophoretic formulations may be prepared according to the present invention by intimately mixing an inorganic substance having a desired particle size with a liquid vehicle selected from the group consisting of nitro alkanes having 1 to 3 carbon atoms and halogen derivatives thereof. The formulations containing the inorganic substance may also be prepared from the inorganic substance of larger particle size by reducing larger particles to the desired particle size by a procedure such as ball milling in a small quantity of at least one of the above-mentioned liquid vehicles to form a slurry. Compositions contemplated by the present invention contain particles ranging in size up to 50 microns. The preferred particle size is between 0.5 and 10 microns. Smaller particles are preferred when deposits of heavier substances are to be formed because the settling rate of smaller particles is lower. Slurry mixtures prepared by ball milling are diluted with organic solvent sufficient to form a 10% by weight concentration of solids to render them sufficiently dilute for use as electrophoretic formulations. Compositions having between 5 and 15 weight percent of solids can be employed advantageously in this process. The proper selection of the liquid vehicle depends upon the density of the dispersoid. It is preferred to approximate the density of the solid and that of the liquid as closely as possible. The formulation is then in condition for use in depositing the dispersed particles upon the particular article to be coated. One way in which the density of the formulation can be modified is by combining with it, up to 50% by volume of a high density inert organic additive such as chloroform, carbon tetrachloride or tetrabromoacetylene.

When electrophoretic formulations such as those having the above-described combination of properties are to be employed in coating processes, conventional electrophoretic techniques may be employed. In normal use the above-described electrophoretic bath is found to be stable and the particles are found to remain in suspension and may be used for coating other articles over a period of time. Moreover, where the coated sample is allowed to remain in the bath, none of the deposit formed on the article is found to rub or slough off during the electrophoretic treatment or subsequent thereto. With regard to the character of the coating, it is also the uniform finding that it does not rupture or pull off as it is removed from the bath. Highly adherent coatings may be prepared in this manner.

One particular advantageous property of the coating formed is that it consists entirely of the dispersed material. No additives are included either in the bath or in the coating, since they are not necessary either to impart stability to the bath or to increase the zeta potential thereof.

We have found that through the use of this electrophoretic formulation, smooth uniform coatings of up to ⅛ inch thickness can be applied without sloughing off of the coating. After the coated article is removed from the bath, it is dried to remove all of the liquid solvent.

The coating at this stage, while adherent, may be easily removed by simply wiping it off. After electrophoretically depositing the coating it may be desirable to treat the coated article in order to permanently attach the particles to the base and to each other. The particular type of treatment employed for this purpose will depend upon the coating composition applied, the characteristics of the base upon which it is deposited and the use for which the final product is intended. A combination of isostatic pressing and heat treating steps after deposition consolidates the layer and makes it adhere to the base more strongly.

The following is an example of one particular type of treatment which we have found useful in permanently attaching a coating to a base.

EXAMPLE I 32 grams of nickel oxide, 81.3 grams of ferric oxide and 16 grams of chromium powder were ball milled 8 hours in nitropropane. The resultant dispersion was then diluted with nitropropane to form an electrophoretic bath containing 10% by weight of solids. A coating of 30 mil thickness was formed on a conductive surface of the base using a direct current potential gradient of 500 volts per inch in 15 seconds.

The deposited layer containing nickel oxide and ferric oxide and chromium was heated to a temperature between 200 and 500° C. in a hydrogen atmosphere and a stainless steel coating was produced. The coating was sintered at temperatures of from 600 to 1000° C. The sintered coating thus formed was porous and it was deemed necessary to eliminate this porosity in order that the stainless steel coating might be used for corrosion protection of the base metal.

After sintering, the coated article was cold-worked to achieve a desired densification. A high degree of densification, up to 100% theoretical density, has been achieved by isostatically pressing the coated part at pressures up to 60,000 p.s.i. and then sintering to about 1000° C. in an inert atmosphere.

EXAMPLE II

Using the same solid composition dispersed in a solvent vehicle of 50% nitropropane and 50% acetylenetetrabromide, a coating of 20 mil thickness was formed using a direct current voltage potential gradient of 500 volts per inch in 15 seconds. This coating was consolidated as described in Eaxmple I.

EXAMPLE III

In 1-chloro-1-nitropropane with the same potential gradient a coating of 15 mil thickness was obtained in 15 seconds. The coating formed was consolidated according to the procedure described in Example I.

Table 1 lists the alloy compositions which have been successfully coated on mild steel.

*Table 1*

| Coating | Suspension Composition (Percent) | | | Composition After Reduction (Percent) | | |
|---|---|---|---|---|---|---|
| | NiO | Fe₃O₄ | Chromium | Nickel | Iron | Chromium |
| Nickel | 100 | | | 100 | | |
| Nichrome | 84.4 | | 16.6 | 80 | | 20 |
| Inconel | 77.3 | 10.5 | 12.2 | 74 | 10 | 16 |
| Stainless Steel 316 | 14.7 | 70.8 | 14.5 | 14 | 67 | 19 |

These coatings have been found to be particularly suitable for protection against the oxidation and corrosion effects of such materials as fused salts, liquid metals and other corrosive media.

In another application, the invention can be used in forming layers or matrices on formed metal parts to bond the parts together. A specific application relates to the joining of metal parts of a structure which is exposed to the effects of corrosive media. For example a metal joint may serve to replace joints that are brazed with low melting brazing alloys, thereby increasing the resistance of the joints to corrosion media to which they would be exposed.

EXAMPLE IV

In this application two stainless steel plates .030 inch thick were sand-blasted and then coated electrophoretically with nickel oxide suspended in nitropropane to yield approximately 1.5 mils of nickel metal. The plates were then heated in hydrogen at 300° C. to reduce the nickel oxide coating and after cooling, the coated faces were placed together and pressed at 25 tons per square inch. The pressed stainless steel sandwich was then heated to 1000° C. for approximately one hour. The resultant structure was a strongly bonded sandwich which withstood severe impacting.

The coating process of this invention is not limited to the specific examples disclosed herein. A wide range of utility may be realized in applying films or layers to a wide variety of electrically conducting surfaces since the configuration of the base does not prevent attaining the desired electrophoretic coating. A corrosion resistant surface may, for example, be electrophoretically applied to the inner surface of tubes or cylinders according to the method of the present invention to protect the inner surface material from corrosive media passing therethrough.

In preparing the electrophoretic formulations of the present invention, we have found that nitroparaffins having one to three carbon atoms and halogen derivatives of such nitroparaffins may be used advantageously as the dispersal medium. Moreover, we have found that the stability of the suspension of particles is greatly increased as compared to electrophoretic formulations previously known to us. By the stability of the suspension is meant the degree to which the particles tend to remain dispersed as opposed to those tending to settle from the vehicle.

The liquid vehicles of the present invention have the further advantage of being poor conducting media of electric current. This permits potential differences as high as 1000 volts D.C. per inch to be maintained between electrodes without fear of dielectric breakdown of the liquid vehicle.

An electrophoretic formulation incorporating the vehicles of the present invention is particularly suitable for dispersing high density materials. Among the materials which may be formed into dispersoids are metal powders, metallic oxides, borides, carbides, hydrides, nitrides, borates, carbonates, tungstates, molybdates, silicates and refractories. Among the liquid vehicles that we have found particularly useful in formulating these electrophoretic dispersions in accordance with this invention are nitromethane, nitroethane, 1-nitropropane, 2-nitropropane. Of the halonitropropanes we have found useful are 1-chloro-1-nitropropane, 2-chloro-2-nitropropane and 1,1, dichlor-1-nitroethane. The nitroparaffins and chloronitroparaffins may be used separately or in combination with each other.

As an additional feature of the present invention the density of these vehicles may be controlled by adding up to 50% by volume of such halogenated solvents as carbon tetrachloride, chloroform or acetylene tetrabromide. Vehicles having densities up to 3 grams per cubic centimeter can be obtained as compared to conventional electrophoretic dispersions of 0.7 to 0.8 gram per cubic centimeter. These high density vehicles are particularly desirable for dispersing such compounds as the metallic oxides (iron oxide $Fe_3O_4$) 5.2 grams per cubic centimeter, nickel oxide, 7.5 grams per cubic centimeter, chromium oxide 5.21 grams per cubic centimeter and such metal powders as iron, 7.86 grams per cubic centimeter, nickel 8.9 grams per cubic centimeter or chromium 7.1 grams per cubic centimeter.

Since many embodiments might be made of the present invention and since many changes might be made in the embodiment described, it is to be understood that the foregoing description is to be interpreted as illustrative only and not in a limiting sense.

We claim:

1. The method of producing an inorganic coating of high wet strength on a conductive surface which comprises contacting said surface with a suspension of finely divided particles of said inorganic substance in a liquid vehicle selected from the group consisting of nitromethane, nitroethane and nitropropane and derivatives thereof in which hydrogen is replaced by halogen and electrophoretically depositing said particles from said suspension, said inorganic substance being capable of being deposited electrophoretically from said liquid vehicle.

2. The method according to claim 1 wherein the liquid vehicle is 1-nitropropane.

3. The method according to claim 1 wherein the liquid vehicle is nitromethane.

4. The method according to claim 1 wherein the liquid vehicle is nitroethane.

5. The method according to claim 1 wherein the liquid vehicle is 1-chloro-1-nitropropane.

6. The method of producing a high wet strength coating of an inorganic substance on a conductive base which comprises forming a suspension of particles of said inorganic substance the diameters of which are smaller than 50 microns in a liquid vehicle selected from the group consisting of nitromethane, nitroethane, nitropropane and derivatives thereof in which hydrogen is replaced by halogen, contacting said base and suspension and electrophoretically depositing the particles from said suspension at a direct current potential of from 50 to 500 volts per inch said inorganic substance being capable of being deposited electrophoretically from said liquid vehicle.

7. The method of producing an inorganic coating of high wet strength on a conductive base which comprises forming a suspension of finely divided particles of said inorganic substance in a liquid vehicle selected from the group consisting of nitromethane, nitroethane, nitropropane and derivatives thereof in which hydrogen is replaced by halogen, contacting said base and suspension and electrophoretically depositing the particles from said suspension at a direct current potential of from 50 to 500 volts per inch said inorganic substance being capable of being deposited electrophoretically from said liquid vehicle.

8. The method of claim 1 wherein the liquid vehicle contains at least 50% of a material of the group consisting of nitromethane, nitroethane, nitropropane and derivatives thereof in which hydrogen is replaced by halogen.

9. The method of forming an inorganic coating on a conductive base which comprises finely dividing the inorganic substance to be coated onto said base, forming a suspension of said finely divided substance in a liquid vehicle, said vehicle containing at least one liquid selected from the group consisting of nitromethane, nitroethane, nitropropane, and derivatives thereof in which hydrogen is replaced by halogen and said vehicle containing up to 50% by volume of a high density halocarbon, contacting said base and suspension and electrophoretically depositing said inorganic substance on the conductive surface of said base said inorganic substance being capable of being deposited electrophoretically from said liquid vehicle.

10. The method according to claim 9 wherein the concentration of the finely divided substance in said liquid vehicle is about 10% by weight.

11. The process of forming a composite coating of inorganic substances on a conductive base which comprises finely dividing and admixing the inorganic substances to be coated on said base to particle sizes less than 50 microns, forming a suspension of said finely divided substances in a liquid vehicle containing at least one liquid selected from the group consisting of nitromethane, nitroethane, nitropropane and derivatives thereof in which hydrogen is replaced by halogen, contacting said suspension with the conductive portions of said base, electrophoretically depositing said finely divided substances on said base and heating and compressing said substances thereon to firmly bond them to said base said inorganic substance being capable of being deposited electrophoretically from said liquid vehicle.

12. The process of forming a composite coating of stainless steel on a conductive base which comprises finely dividing and admixing chromium metal and iron and nickel oxides to be coated on said base to particle sizes less than 10 microns, forming a suspension of said finely divided substances in a liquid vehicle containing at least one liquid selected from the group consisting of nitromethane, nitroethane, nitropropane and derivatives thereof in which hydrogen is replaced by halogen, contacting said suspension with the conductive portions of said base, electrophoretically depositing said finely divided substances on said base and heating said coating in a reducing atmosphere to reduce said metal oxides and compressing said reduced substances thereon to firmly bond them to said base.

13. The process according to claim 11 wherein said heating is to about 1000° C. and the compressing is at an isostatic pressure up to 60,000 p.s.i.

14. A coating formulation for electrophoretic deposition consisting of an inorganic substance suspended in a liquid vehicle selected from the group consisting of nitromethane, nitroethane, nitropropane and derivatives thereof in which hydrogen is replaced by halogen said inorganic substance being capable of being deposited electrophoretically from said liquid vehicle.

15. A coating formulation for electrophoretic deposition consisting of an inorganic substance suspended in a liquid vehicle consisting of (1) a nitroparaffin selected from the group consisting of nitromethane, nitroethane, nitropropane and derivatives thereof in which hydrogen is replaced by halogen and (2) up to 50% by volume of a halogenated solvent selected from the group consisting of chloroform, carbon tetrachloride and acetylene tetrabromide said inorganic substance being capable of being deposited electrophoretically from said liquid vehicle.

16. A coating formulation for electrophoretic deposition comprising finely divided particles of iron oxide, nickel oxide and chromium dispersed in a liquid vehicle selected from the group consisting of nitromethane, nitroethane, nitropropane and derivatives thereof in which hydrogen is replaced by halogen.

References Cited in the file of this patent

FOREIGN PATENTS 634,187     Great Britain _____ Mar. 15, 1950

OTHER REFERENCES

Briggs: J. of P. Chem., vol. XXXII, pages 641–675, May 1928, page 653.

Shyne et al.: Plating, October 1955, pp. 1255–1258 (page 1256 relied on).